April 10, 1973   M. W. POLAK   3,726,756
PULPING OF WOODY SUBSTANCES IN GASEOUS MEDIA
Filed Dec. 14, 1970   7 Sheets-Sheet 1

INVENTOR.
MARIO WITOLD POLAK
BY
Kent & Ade
AGENTS.

INVENTOR.
MARIO WITOLD POLAK.
BY
Kent & Ade
AGENTS

INVENTOR.
MARIO WITOLD POLAK

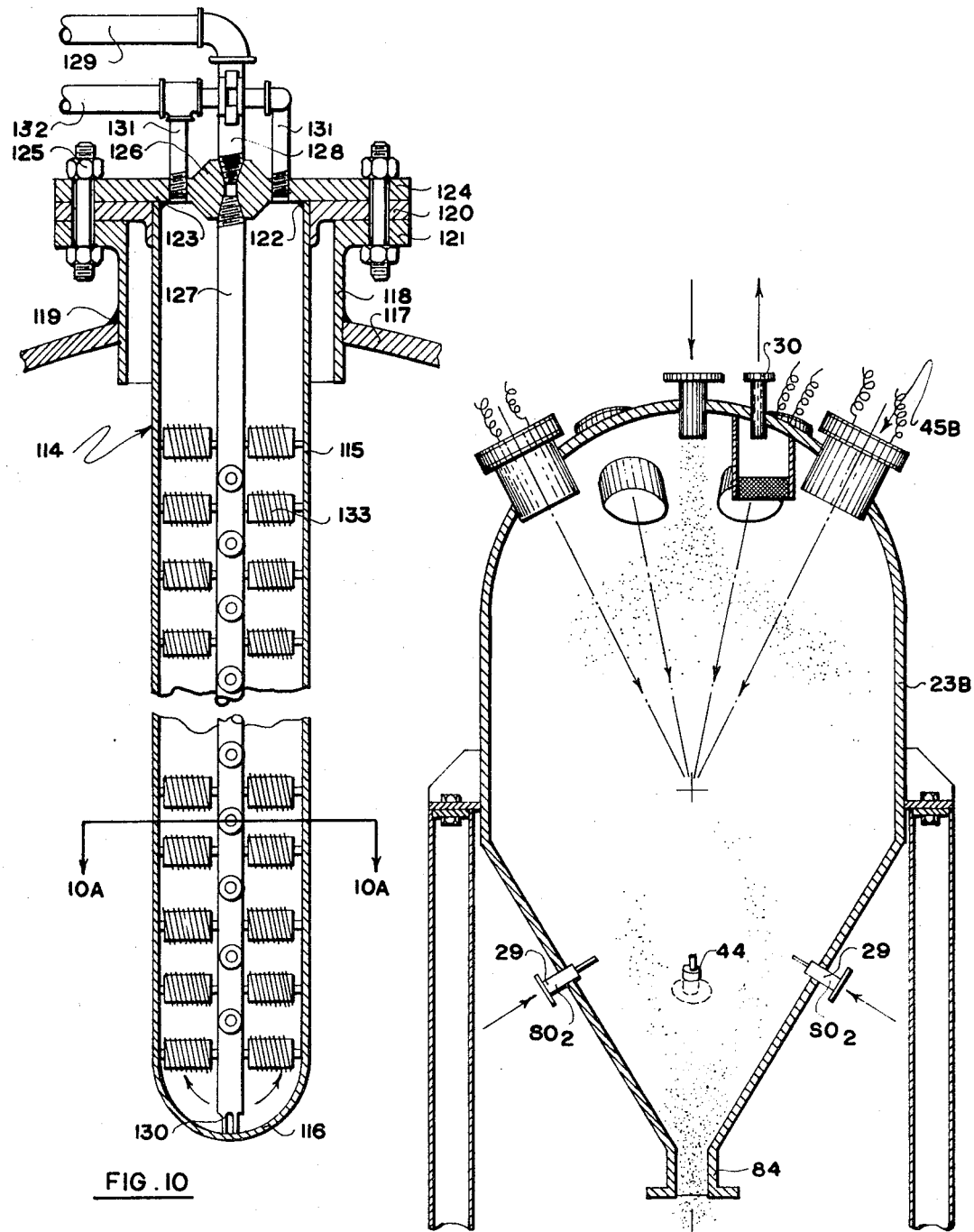

3,726,756
PULPING OF WOODY SUBSTANCES IN GASEOUS MEDIA

Mario Witold Polak, Vancouver, British Columbia, Canada, assignor to General Fluid Dynamics International
Filed Dec. 14, 1970, Ser. No. 97,934
Int. Cl. D21c 5/00
U.S. Cl. 162—50                                    15 Claims

ABSTRACT OF THE DISCLOSURE

Lignin is extracted from wood chips or the like to form wood pulp by treating the amorphous lignin molecule, which binds and cements the individual bundles of cellulosic fibres, with a gaseous reactant in an environment of ultrasonic radiation without change of state of the reactant and without the addition of prepared or mixed solvents or aqueous solutions.

---

This invention relates to new and useful improvements in processes and apparatus for the treatment of any porous woody or vegetable matter occurring in nature as a product of photosynthesis of carbon dioxide, water and minerals. Such substances are in the form of solids and occur as wood, grass, bamboo, bagasse, straw or similar substances all of which consist substantially of cellulose fibres and lignin with varying amounts of minor additional constituents.

Numerous processes are known for the delignification and pulping of woody substances and extraction of lignin from the cellulosic mass of fibres. In all existing processes, aqueous solution chemicals having either acidic, alkali or neutral character are pumped into a digester in which the woody substance or other raw material is immersed, allowed to absorb the said aqueous chemical solution, subjected to temperature and pressure conditions, and after a process of penetration, impregnation and combination of the chemical constituents of the said solution, and also after a certain retention time period known as cooking, the lignin constituent of the raw material passes into the solution through a process of ion exchange and mixes with the surrounding solution known as pulping or cooking liquor.

Thereafter the pulp mass and the spent and contaminated liquor are discharged into another vessel or blow tank where they are separated, the pulp mass being conveyed to screening and washing, and the contaminated and spent liquor diverted to evaporators, recovery furnace for burning, and the remaining smelt recovered, processed, fortified and re-used all over again.

All these processes including variations in chemical composition of the aqueous solution, character of such solutions, pressure and temperature, ratio of liquor to wood and time of residence, involve more or less considerable chemical losses through combination with the raw material, and through the extensive auxiliary and supporting chemical recovery equipment, which forms an essential part of a modern pulp mill.

Such losses, other than through chemical combination with the raw material, occur in the recovery furnace and in the process of combustion and are wasted in the exhaust gases as products of combustion. Many of the organic and inorganic chemical constituents of the spent liquor, when subjected to high temperature pyrolysis in the said furnace, convert to bi-valent sulphur gases and, when mixed with the combustion air, produce a major air pollution problem through their offensive odors.

In accordance with the present invention, a process for the extraction of the lignin constituent of woody and vegetable substances is characterized by the fact that the amorphous lignin molecule, which binds and cements the individual bundles of cellulosic fibres, is treated with a gaseous reactant without a change of state of the said reactant and without the addition of prepared or mixed solvents or aqueous solutions.

The invention also covers an installation for carrying out the process set forth above including apparatus for the ultrasonic treatment of the raw material charge in a gaseous environment under conditions of pressure and temperature whereby the gaseous reactants are agitated and set in motion by ultrasonic wave transducers or radiators thereby aiding penetration and impregnation, and facilitating molecular substitution of the available donor molecule present in the gases at the free radical groups of the lignin molecule, thereby accomplishing the rupture of the lignin-carbohydrate bonds of the hemicellulose fraction as well as the weaker associations of the middle lamella and cell wall of the fibres.

Another object of the present invention is a method for the utilization of the ever present colloidal and capillary moisture in woody and vegetable substances from which pulps may be manufactured, whereby such minute quantities of the moisture in the form of pure water are used in the said reactor or autoclave to form equally minute quantities of acidic or alkali solvent within the porous structure of the raw material substance in sufficient quantities to react with the lignin reactive groups and affect the necessary transport mechanism to withdraw the said lignins from the interior of the fibres and bundles of fibres and deposit the then soluble and chemically altered lignins on the outside of the fibres or chips or shreds through the mechanism of differential partial pressure which this process creates between the interior regions of each chip or shred of raw material and the environment, which is the interchip gaseous space all within the said reactor chamber.

Another object of the present invention is the method for the recovery of the said moisture loss due to the differential partial pressure of the gases inside and on the outside of each wood chip or shred from the water saturated gaseous environment in the reactor chamber, withdrawal of the said saturated gas, through a pipe conduit, dehydration of the gas stream in an automatic two-tower solid desiccant dehydrator, returning of the dried gas to the reactor, and division of the recovered free water into two streams, one returning to the reactor for completing the delignification process, the other to washing, screening and other subsequent secondary post-pulping processes, which are conventional and do not form a part of this invention, including but not necessarily limited to bleaching of the product.

Moreover, the process and the method of producing commercial pulps from woody or vegetable substances as described in this specification is characterized by the absence of a number of pieces of large equipment and auxiliary facilities forming an essential part of conventional pulp mills and chiefly dealing with mixing, handling, pumping, monitoring, evaporation, burning, causticizing, and reusing of the aqueous liquor solutions.

Such liquors are replaced with straight gaseous reactants under pressure, which act as a donor of substituting chemicals, but do not accept any atoms or molecules from the lignin constituent of the raw material, and therefore do not become contaminated or chemically altered. With the exception of removal of the entrained water with which the gas becomes saturated, and make-up of normal losses through absorption and combination with the lignin free radical groups, the gaseous reactants remain unaltered and are recirculated through the system on a continuous and uninterrupted basis, by means of a compressor and with no other supporting or auxiliary equipment, thereby eliminating a substantial portion of capital equipment costs and marked reduction in operating labour requirements.

In addition to the aforementioned characteristics of the present invention relating to pulping of woody or vegetable substances, the method and apparatus described in this specification by which solid woody or shredded particles of cellulosic substances are delignified and the fibres are set free as commercial pulp is further characterized by the fact that all pieces of equipment forming the basis for this invention are interconnected with pressure tight piping, there is no relieving of excess vapours, no relieving of bi-valent sulphur compounds since none are formed, no products of combustion and formation of mercaptans since there is no recovery furnace nor lime kilns from which such gases are emitted and no open tanks, vats or mixers which are also major contributors to evaporative gas emissions.

While the recovered lignin is in a thermoplastic state, it may be diverted through steam heated or steam traced pipe to an earthen pit for disposal and solidification, and the product pulp diverted to post-treatment and purification in a conventional manner.

The process hereunder is pollution free, since no gases of either primary or secondary origin are relieved to the atmosphere, or liquid effluents present in such great quantities, that it is essential or beyond control to allow spillage of such waste effluents into rivers, lakes or the sea. The process is further characterized by the fact that it produces its own water, which is derived from the parent raw material, originally as microscopic capillary water bound within the cellular pores, and after treatment described hereabove, appears as a free flowing stream, such water source being of great value to post-treatments of the product pulp in various ways as well as an essential ingredient to slurrying of the pulp product for paper making machines or in bleaching or preparation of other forming operations, in which slurrying of the pulp mass is a prerequisite.

The technique for the utilization of the said capillary water which is always present in woody and vegetable substances irrespective of region or locale or species of material, makes it possible to locate pulp mill installations and such processing facilities as deemed advisable by market conditions, in areas which have hitherto been declared as unsuitable or impossible to harvest, or uneconomical to operate or unfit to operate owing to shortage or absence of adequate water supplies.

Moreover, the process and pulp mill installations in which, the delignification and pulping of the raw materials follows the technique set forth in these specifications, offers the possibilities of establishing such pulp mill installations in semi-arid areas and in areas having sources of raw material or forests of inferior size or quality trees, or in areas where such inferior forests may well be utilized as a once through pulping operation and the conversion of the land into agricultural land, thereby eliminating wasteful destruction of resources, burning of huge quantities of valuable fibre or burying of whole trees as in large land clearing undertakings.

Such once through pulping operations may well be performed in portable or semi-portable pulp mills, whose concept is hereby presented as part of this specification.

The process is characterized by the self-contained and self-sustained mode of operation, quipment and machinery lay-out, continuous and uninterruptible flow of materials and reactants, with only the electric power supply being required for connection to a source, which normally is provided by an outside utility company. Even this is not a prerequisite in locating the pulp mill near such source of electric power, for it is well within the economics of the process described therein to generate such electric power on site and by either Diesel-Electric or L.P.G. or Kerosene-Gas Turbine-Electric method.

Such portable or semi-portable pulp mills of smaller capacity may be shop prefabricated, shop assembled, marked for identification and trucked to location, and the individual pieces of equipment and machinery re-assembled on site, on suitable steel bases, the marked pieces of welded pipe installed and the entire pulp mill erected in a matter of two or three weeks and in readiness for operation. Similarly, and after the area has been worked out within an economical harvesting radius, say 5 or 10 miles, which operation may take several years, the plant, equipment and machinery may be dismantled again and reerected at another site, and again set into operation, for a total operating period commensurate with the quality and strength of the materials of construction of all the working parts, vessels, pipe walls, motors and valves, which carry normally a heavy duty life span of 25 years.

In summary, the solid or woody substance is divided into chips, shreds or particles by well known means such as chipping or shredding. The raw material or chip mass is then conveyed into region of slight mechanical compression in a totally enclosed vessel. Atmospheric air from the interchip spaces within the said vessel is evacuated and the chip mass is steamed, conveyed to another totally enclosed vessel equipped with means for conveying the raw material either by a drag type conveyor or the like. Within this conveyor, the chip mass is subjected to the action of a gaseous chemical environment for pretreatment and impregnation followed by conveyance of the mass into a reactor in which the mass is subjected to a different gaseous environment upon which ultrasonic vibrations may be superimposed by strategically located transducers or radiators.

The use of ultrasonic vibrations accelerates the rate of molecular substitution in the lignin molecule, thereby breaking up the chemical and mechanical bonds of the binding native lignin and freeing the fibres therefrom to yield merchantable raw pulp and soluble, chemically altered lignin after a process of mechanical separation or washing or any such separating process well known in the art.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying figures, in which:

FIG. 10 is an enlarged sectional view of one of the transducer elements.

FIG. 10A is a sectional view substantially along the line 10A—10A of FIG. 10 and showing one radial arrangement of one set of transducers.

FIG. 11 is a fragmentary sectional view of an alternative reactor arrangement.

In the drawings like characters of reference indicate corresponding parts in the different figures.

Figure 1:
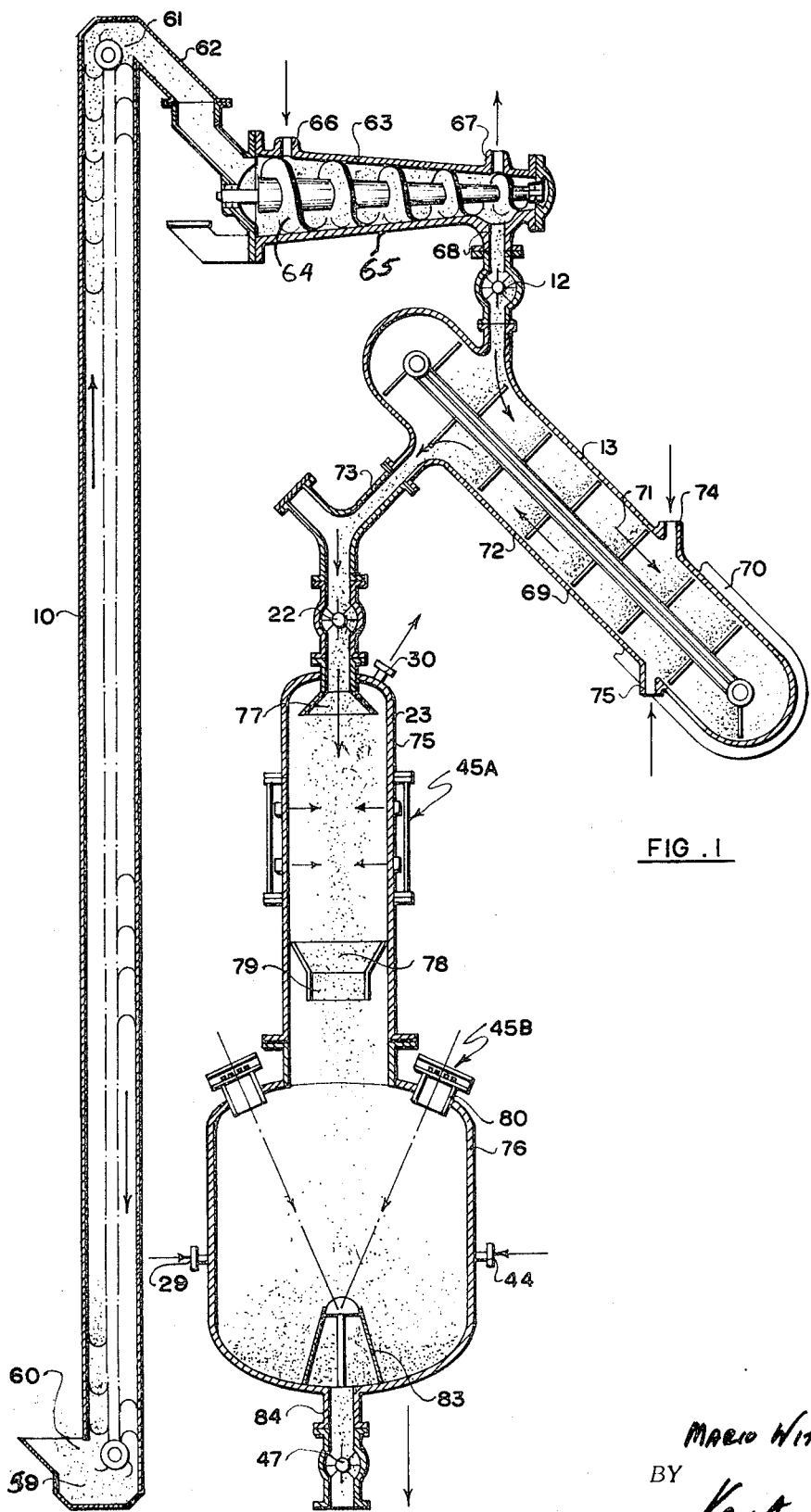
FIG. 1 is a sectional view of one embodiment of the apparatus used in the process.

Although the process shown in the drawings and hereinafter to be described, utilizes anhydrous ammonia gas and sulphur dioxide gas, nevertheless it is to be understood that many combination of gases could be used providing, of course, that the necessary delignification occurs. Such gases have been identified in the claims as "depolymerizing gases" and the selection of these gases together with the necessary selection of the temperature and pressures under which they operate will be well known to those skilled in the art.

Furthermore the gases chosen as illustrative are readily available at the present time and are most economical in use.

The process is designed primarily for use with a continuous type reactor although some of the drawings show that the process can be used with a batch type reactor.

Figure 12:
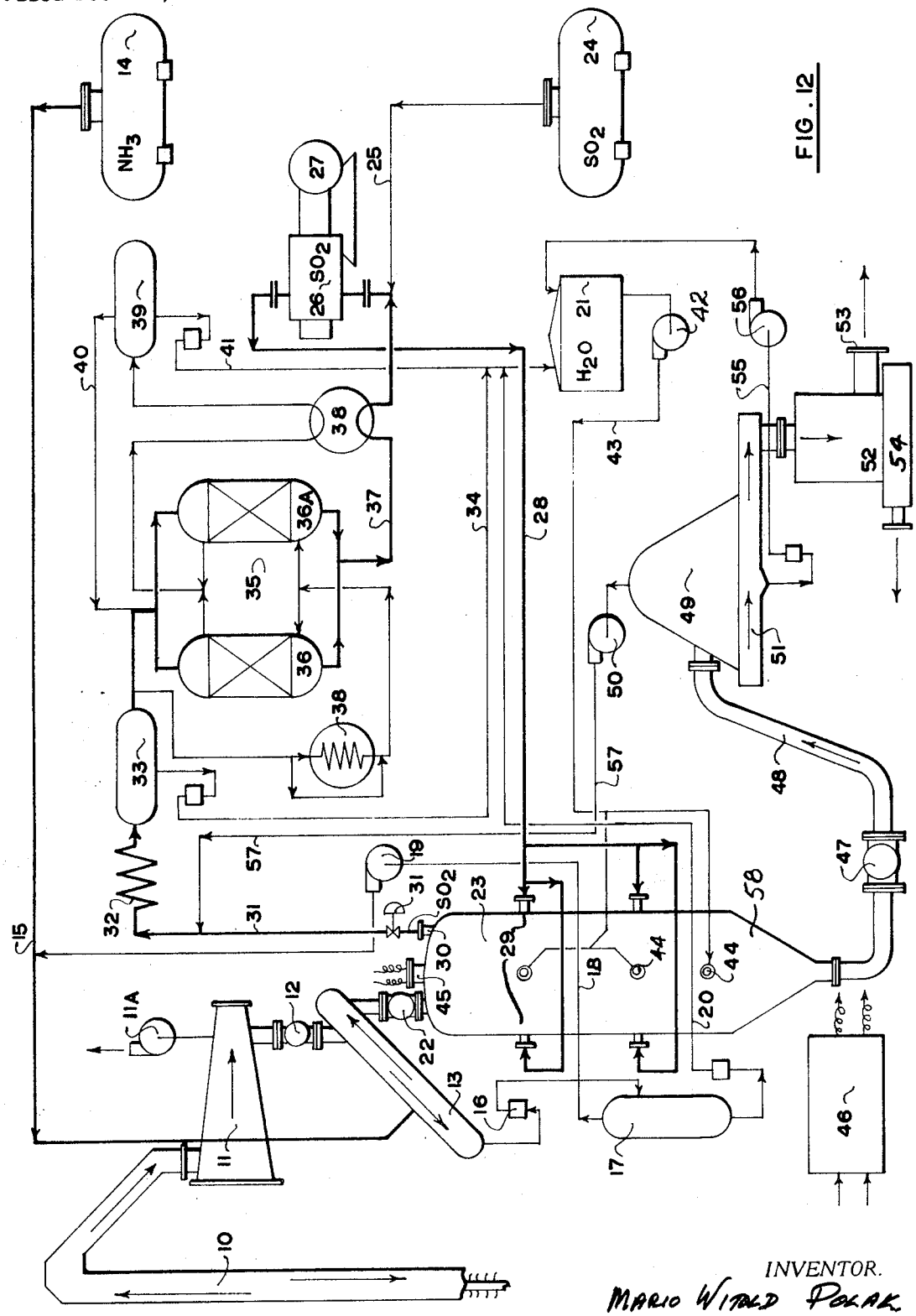
FIG. 12 is a schemtaic view showing the entire process based on continuous reactor operation.

Reference should first be made to FIG. 12 which shows the schematic layout of the process and apparatus using a continuous type reactor.

Reference character 10 illustrates a bucket or similar conveyor which carries chipped woody substance in the form of a chip mass, from the chip pile (not illustrated) to a pressure feeder 11. The moisture content of the chip mass is corrected in this phase so that it is between 50% and 100%, and the air is evacuated by vacuum pump 11A.

The chip mass then passes through a rotary star feeder valve 12 and into a pretreater or impregnator 13. The chip mass is pretreated at this point by the introduction of anhydrous ammonia gas from a source of supply 14 via a conduit 15 and any condensate drains from the lower end thereof through a hydrostatic trap 16 and thence to a knock-out drum 17 which is conventional. Excess ammonium hydroxide is also drawn through the hydrostatic trap 16 and is separated in the knock-out drum. The gas passes via a conduit 18 to a small compressor 19 and joins the main ammonia stream 15 and the liquid passes from the knockout drum through a conduit 20 and thence to a water storage tank 21. The pretreated chip mass passes through a further star valve 22, to the upper end of a reactor vessel 23.

A depolymerizing gas which, in this embodiment, takes the form of gaseous sulphur dioxide, is conveyed from a source of supply in the form of tank 24, through a conduit 25 to a compressor 26 operated by a source of power 27. It then passes through conduit 28 to the reaction chamber or vessel 23 and enters the chamber and the chip mass therein through a plurality of entrance ports 29 situated around the perimeter of the vessel 23. Gas is drawn off through conduit 30 so that the gas is constantly circulating. This conduit 30 originates from the upper or vapour space of reactor 23 and is pressure control valve operated, the valve designated as 31 and then to an air cooler 32 and thence to a knock-out drum 33 which removes liquid water which in turn passes through conduit 34 to the aforementioned storage tank 21.

The wet gas then passes to the regenerating tower assembly 35 consisting of two towers in parallel 36 and 36A. Only one tower is used at one time and the gas passes downwardly through the tower which is a solid desiccant granular bed type device. This removes the water and the gas which is now dry, passes from the tower through conduit 37 to a condenser 38 and thence back to the compressor 26.

A portion of the gas passes from the knock-out drum 33 downwardly through a heater element 38 and this hot gas is used to regenerate the tower 36 or 36A which is not being used. The hot gas drives out the moisture from the desiccant bed and this gas also passes through the condenser 38 and thence through a knock-out drum 39, the said regenerating stream passing through a conduit 40 and mixing with the main flow stream. Liquid water from the knock-out drum 39 once again passes to the water storage tank 21 via conduit 41.

During the delignification process occurring within the reactor chamber or vessel 23, additional moisture is required as replacement for that lost to gas and this is supplied by a pump 42, through conduit 43 to inlets 44 and within the wall of the reaction chamber, which takes the form of high pressure fog nozzles.

Ultrasonic radiation is supplied to the chip mass within the reactor 23 by means of transducer elements 45, the ultrasonic frequencies being supplied by a high frequency generator 46 operatively connected to the transducer elements 45 and operating in a well known manner.

On a continuous basis the delignified chip mass is extracted from the lower end of the reactor vessel through a star valve 47 and thence under pressure through a conduit 48 to a conventional blow tank 49. This blow tank, which is maintained under slight pressure, collects the delignified chips and releases the residual gas which is withdrawn by a vacuum pump 50 and the pulp mass is augered by auger 51 to a centrifuge 52 or the equivalent which separates the lignin sulphonate from the pulp. The pulp passes through the outlet 53 to a storage area and the lignin sulphonate is augered by auger 54 to a disposal area. In the blow tank auger 51, a conduit 55 conveys free water via a pump 56 to back to the water storage tank 21 and the aforementioned vacuum pump 50 which extracts any residual gases, is connected via conduit 57 to the aforementioned conduit 30 and hence to he regenerator 35.

Alternatively, the lignin suphonate may be washed from the pulp prior to reaching the blow tank. Under these circumstances a zone in the base of the reactor, identified by reference character 58, permits this to occur.

From the foregoing it will be appreciated that the system is closed inasmuch as excess water is produced and the reactant gases contained are recirculated.

In detail, reference should first be made to FIG. 1. 10 illustrates the conveyor which in his instance, is a bucket type vertically situated continuous conveyor picking up wood chips or the like from the lower end 59, said lower end being fed from a source of supply as indicated by reference character 60. The wood chips are discharged over the upper end 61 and pass through a conduit 62 to the pressure feeder 63. This is a tapered auger conveyor 64 within a casing 65 and steam is introduced through an inlet 66 and air is extracted via a vacuum pump (not illustrated) connected to an outlet 67. This adjusts the moisture content of the chip mass to a predetermined amount and the tapered auger compresses same slightly as it passes to the chip outlet 68. The chip mass then passes through a conventional rotary star valve 12 and thence into the pretreater 13. In the present embodiment, this pretreater takes the form of an inclined conveyor 69 within a casing 70 and the conveyor moves the chip mass downwardly along one side as indicated by arrow 71 and thence up the other side as indicated by arrows 72 to discharge the chip mass into the conduit 73.

Futher steam is introduced through an inlet 74 and the pretreating reactive gas which, in this embodiment, consists of anhydrous ammonia (NH$_3$), is introduced through an inlet 75. The anhydrous ammonia combines with the water and forms ammonium hydroxide which is a weak electrolyte. Due to the fact that there is a high rate of diffusion of ammonium ions through the chip mass, the cellulose swells and the fibre passages open to facilitate more rapid penetration of the second reactive gas which is introduced within the reactor 23 as will hereinafter be described.

The pretreated chip mass passing through conduit 73, is introduced into the reactor chamber 23 by means of the conventional rotary start valve 22.

Figure 2:
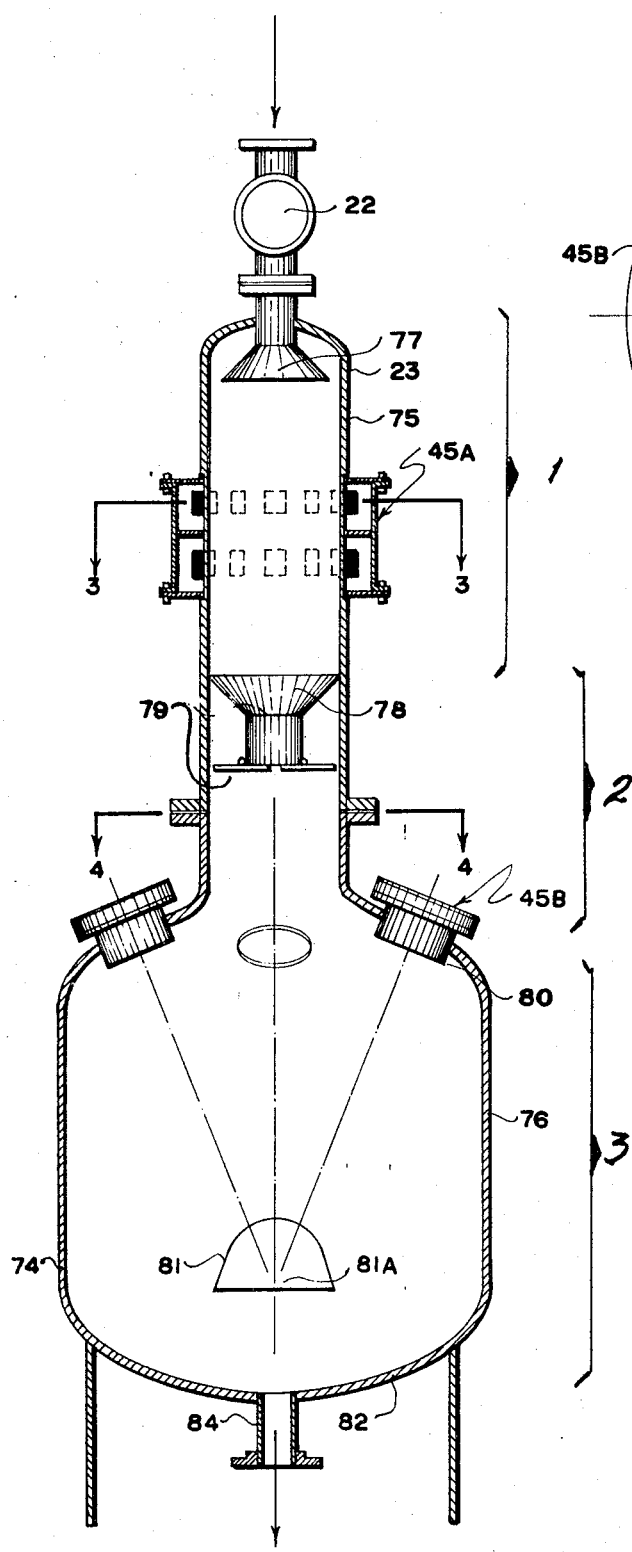
FIG. 2 is an enlarged cross sectional view of the reactor per se of FIG. 1.

Reference to FIG. 2 will show details of the reactor which consists of a vertically situated steel cylinder 74 having, in this embodiment, a relatively narrow upper portion 75 and a main portion 76 therebelow. An upper transducer component collectively designated 45A surrounds the cylindrical narrow portion 75 and an upper cone reflector 77 discharges the chips into this area and the fans them outwardly as well as reflecting back the ultrasonic radiation. A lower cone reflector 78 is also situated within the lower end of the upper section or zone 75 and the chips which have been subjected to ultrasonic radiation, are deposited within this reflector. A two-part hinged flap type check valve 79 spans the base of the reflector and opens intermittently to permit discharge of the chip mass by the mere weight of the chip thereon.

The chip mass passes downwardly throught the lower end of the portion 75 into the main portion 76 of the reactor vessel.

Situated around the shoulder 80 of the vessel is a plurality of transducer elements collectively designated 45B and these direct ultrasonic radiation downwardly and inwardly towards a common locus 81A at which point is situated a focusing diaphram 81. This diaphragm is supported spaced from the base 82 of the vessel by means of struts 83.

A discharge conduit 84 is situated within the base 82 of the vessel and communicates with the star valve 47 as hereinbefore described.

In the embodiment shown in FIGS. 1 and 2, the reactor vessel 23 is divided into three zones, zone 1 indicated by the bracketed portion 1 in FIG. 2 constitutes an irradiation zone whereas zone 2 is a transition zone and zone 3, the major portion of the reactor vessel, is the depolymerization zone.

Figure 6:
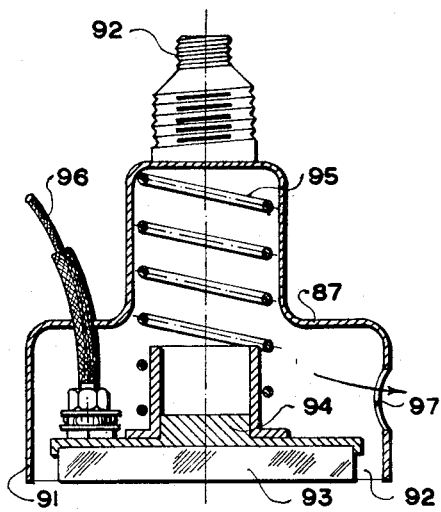
FIG. 6 is an enlarged fragmentary partially sectioned view of one of the transducer elements shown in FIG. 5.
Figure 3:
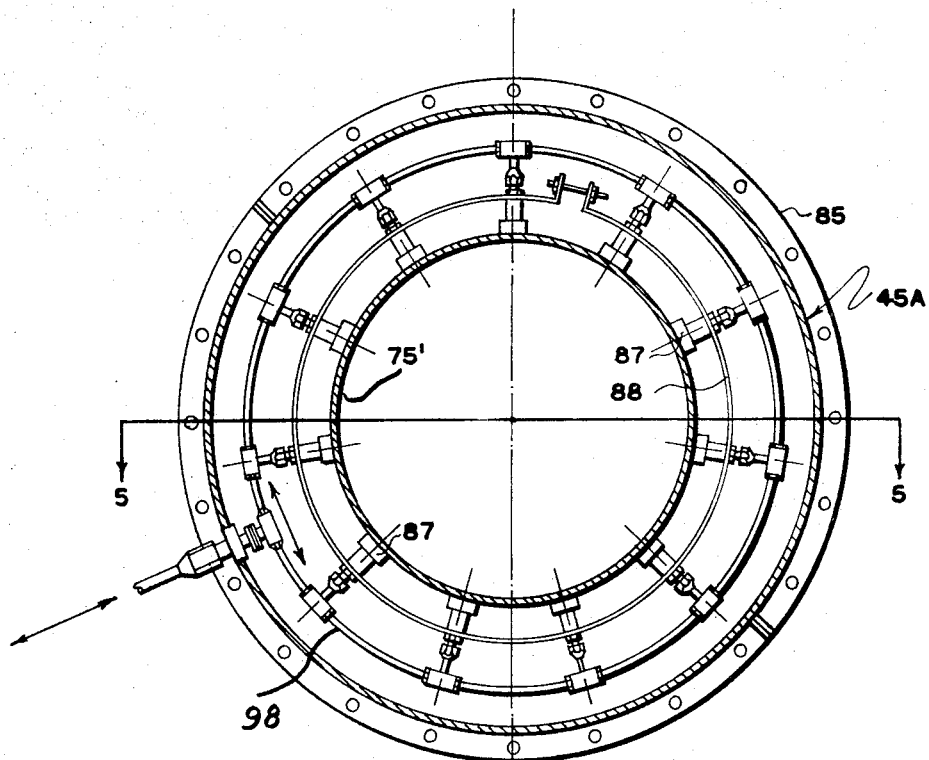
FIG. 3 is an enlarged cross sectional view along the line 3—3 of FIG. 2.
Figure 5:
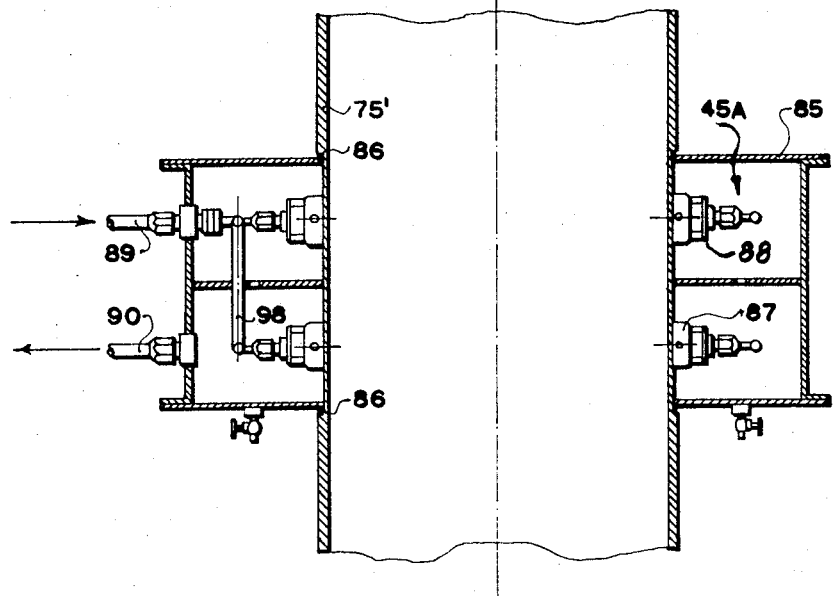
FIG. 5 is a vertical section along the line 5—5 of FIG. 3.

The transducer component 45A is shown in detail in FIGS. 3, 5 and 6. It consists of an annular casing 85 surrounding the cylindrical wall of the upper portion 75 of the vessel 23 being sealed thereto by means of an O-ring seal 86 and at the upper and lower sides thereof.

Two rings of transducer elements 87 are supported within a stainless steel hoop 88, within the housing and these are connected with the high frequency generator 46. Cooling oil enters the housing or casing 85 via inlet 89 and exits from the housing by means of the outlet 90 so that cooling oil is circulated at all times through the housing thus maintaining the transducers within the desired operating temperature range.

FIG. 6 shows the details of the individual transducer elements 87. A housing or shroud 91 is provided with the oil inlet nipple 92 at the one side thereof and carries a quartz crystal or a crystal of similar characteristics at the open face 92 thereof, said quartz crystal being identified by the reference character 93. This crystal is held within a brass anode 94 and a compression spring 95 maintains the crystal against the wall of the vessel when in the assembled position. A conductor 96 extends from the aforementioned high frequency generator 46 to the crystal as clearly shown and the oil outlet is indicated within the housing 91, by reference character 97.

The oil to each individual transducer element is connected to an annular conduit 98 which in turn is connected to a source of coolant oil (not illustrated).

Figure 4:
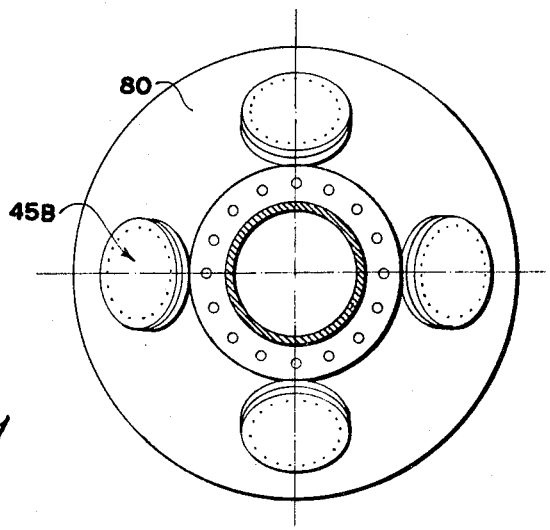
FIG. 4 is a cross sectional view along the line 4—4 of FIG. 2.

FIG. 4 shows a top sectional view of the portion 80 of the housing containing the lower transducer element collectively designated 45B and in this embodiment there are four of these elements situated symmetrically around the shouldered portion 80.

Figure 7:
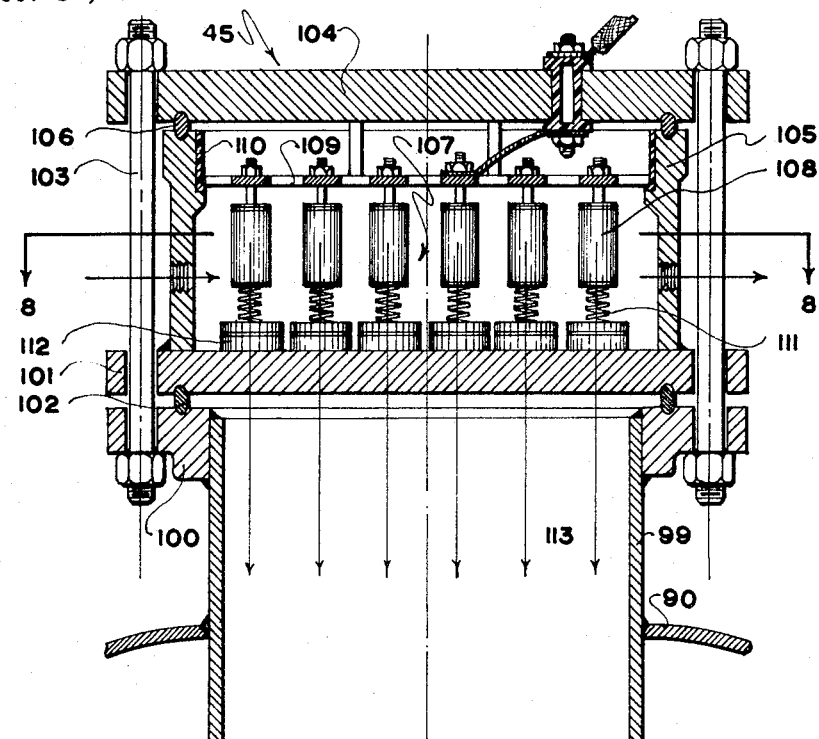
FIG. 7 is an enlarged cross sectional view of one of the transducer elements shown in FIG. 4.
Figure 8:
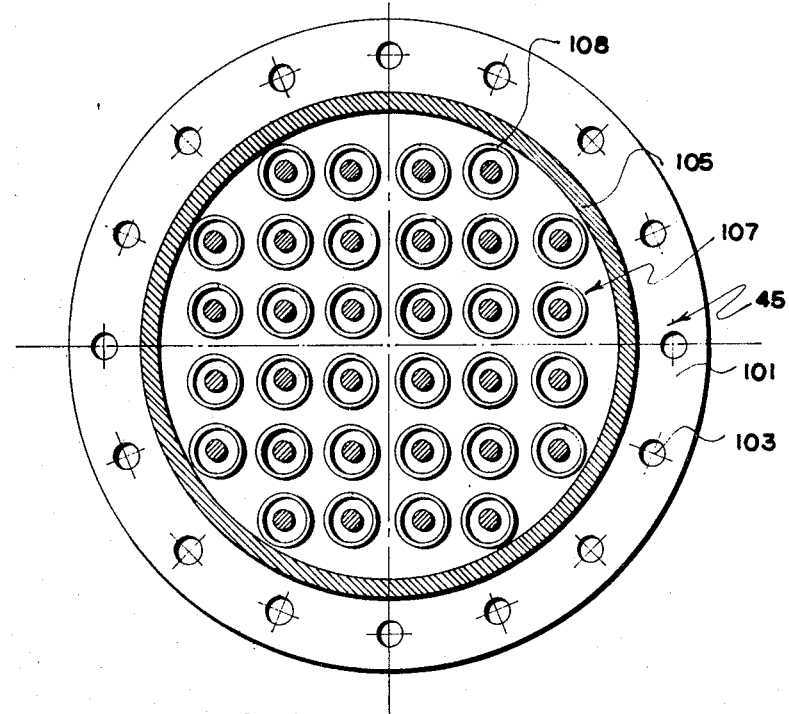
FIG. 8 is a sectional view substantially along the line 8—8 of FIG. 7.

Each of these elements collectively designated 45B is shown in detail in FIGS. 7 and 8.

A relatively short steel tube 99 is welded into the shoulder 90 of the vessel and a flange 100 is welded to the outer end of this tube or pipe. A stainless steel diaphragm 101 is spaced from the flange by means of a corrosion resistant steel ring 102 and nut and bolt assemblies 103 extend through the flange, through the diaphragm, and through a cover plate 104.

A cylindrical housing 105 is spaced from the cover plate by a further mold steel spacer ring 106 and the assembly is bolted together as clearly shown in FIG. 7.

Within the housing is a plurality of ultrasonic radiating elements collectively designated 107 and these are grouped as shown in plan view in FIG. 8.

Each of these consists of an inductance coil 108 suspended from a coil template 109 which in turn is held within the housing through insulating sleeve 110. Springs 111 extend between the coils and the crystals 112 and hold the crystals into contact with the diaphragm 101 so that all radiation generated by these elements radiates downwardly through the sleeve 99 into the reaction vessel, arrows 113 indicating this.

Figure 9:
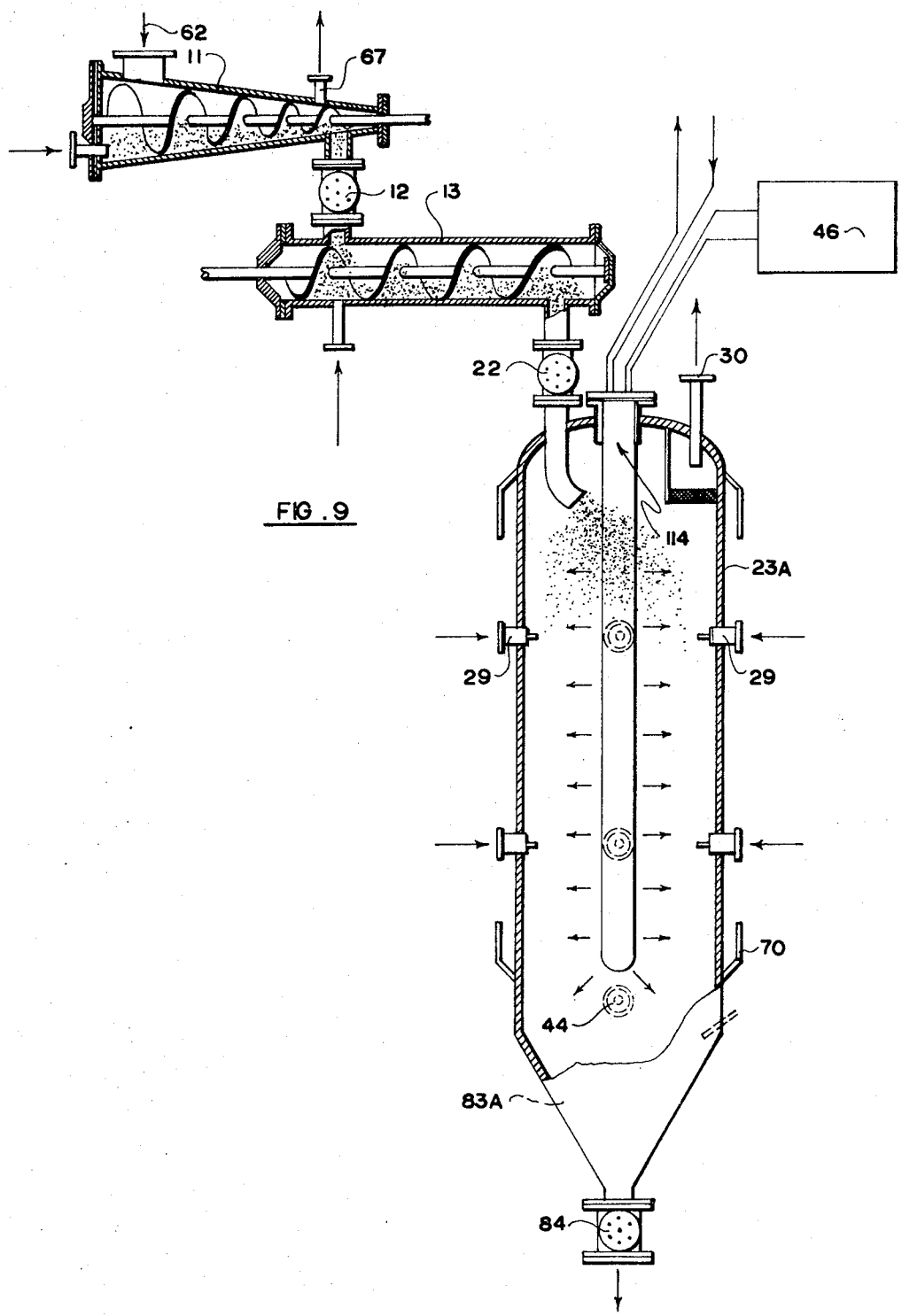
FIG. 9 is a partially sectioned view of an alternative reactor arrangement.

FIG. 9 shows an alternative form of reactor vessel 23A consisting of the cylindrical casing and similar reference characters have been given to the various portions thereof. However, in this embodiment, which is designed for a continuously operating reactor, I have illustrated a magnetostrictive transducer collectively designated 114 and which will hereinafter be described.

FIG. 11 shows a still further construction of reactor vessel 23B and here again similar reference characters have been given to corresponding parts.

In all of the reactor vessels illustrated and described, the pretreated chip mass is acted upon by a further reactant gas which, in this embodiment, consists of sulphur dioxide. This is introduced through a plurality of inlets 29 and is extracted through the upper outlets 30 as previously described.

Additional water is supplied through the intake 44 as hereinbefore described and the chemical reaction of the entire process, utilizing anhydrous ammonia and sulphur dioxide gases, is as follows.

RAW CHIPS OR SHREDS

Environmental conditions:
    P=0.00 p.s.i.g.
    T=50–85 deg. F.
Constituents:
    Cellulosic crystalline materials: $n(C_6H_{12}O_6)$
    Lignin amorphous substance: $n(C_9H_{8.8}O_{2.4}(OCH_3)$ 0.98
    Capillary water: $H_2O$
    Average moisture (water) content by wt. 50% of O.D. wood (O.D. standard designation for oven dry)

↓

PRESSURE FEEDER (11)

P=15 p.s.i.g.
    T=220–250 deg. F.

Slight compaction of chips or shreds
Introduction of low pressure saturated steam
Direct heating of woody substance
Evacuation of interchip space air by vacuum pump
Composition of charge:

|  | At inlet | At outlet |
| --- | --- | --- |
| Cellulosic materials by wt., percent | 47 | 44 |
| Lignins, percent | 20 | 19 |
| Capillary and entrained water, percent | 33 | 37 |

↓

PRETREATER (13)

P=25–100 p.s.i.g.
    T=220–250 deg. F.

Introduction of anhydrous ammonia gas $NH_3$ (75)
Introduction of small amounts of lost water $H_2O$ (74)
Instantaneous reaction and formation of ammonium hydroxide Liberation of heat (not of any consequence)

$$NH_3 + H_2O \underset{-68.75}{\overset{-18.84}{\rightleftarrows}} NH_4OH$$

−10.96   −57.79

Net heat −18.84 Kcal./g. mole $$= \frac{-18.84 \times 1800}{17} = \frac{1,955 \text{ B.t.u./lb.}}{NH_3 \text{ hydrolized}}$$

(a) Formation of ammonium hydroxide (a weak electrolyte),
(b) High rate of diffusion of ammonium ion through substance,
(c) Dissolving lower molecular fractions of cellulose below 2,000 MW and less than 10 degrees of polymerization, mostly gamma-celluloses,
(d) Swelling of cellulose and opening of fiber passages, to facilitate more rapid penetration.

↓

REACTOR (23)

P=50–150 p.s.i.g.
T=240–300 deg. F.

Introduction of gaseous sulphur dioxide $SO_2$ (29)
Circulation of $SO_2$ gas (29, 30)
Circulation and return of lost moisture (44)
Application of indirect heat (jacket or internal coils).

The following reactions occur in the $NH_3$-$SO_2$-$H_2O$ system (1)
$$SO_2 + H_2O \overset{-18.15}{\rightleftarrows} H_2SO_3 \text{ heat } -18.15$$

(2)
$$NH_3 + H_2O \underset{-68.75}{\overset{-18.84}{\rightleftarrows}} NH_4OH \text{ heat } -18.84$$

(3)
$$2NH_3 + SO_2 + H_2O \overset{-61.35}{\rightleftarrows} (NH_4)_2 SO_3 \text{ heat } -61.35$$

$$2(NH_4) + H_2SO_3 \underset{\text{heat } -4.94}{} (NH_4)_2 SO_3 + 2H_2O$$

and $NH_4OH + SO_2$ $NH_4HSO_2$ ammonium sulphite and within each wood chip or fragment containing moisture:

sulphurous acid $H_2SO_3$ as in (1)

But the sulphurous acid in the chips is in equilibrium with two other associated systems, dehydration and electrolytic disassociation:

$$SO_2 + H_2O \rightleftarrows H_2SO_3 \rightleftarrows H^+ + HSO_3^-$$

dehydration is compensated by a continuously recirculated small amount of water.

Since a considerable proportion of the available $SO_2$ is not hydrated and remains as gas, its circulation is made easy by a compressor. Sulphonation of the lignin proceeds as follows:

(4) $RSO_3H \rightarrow RSO_3^- H^+$ disassociation of strong acids
(5) $HSO_3^- + H^+ \rightarrow H_2SO_3 \rightarrow (SO_2 + H_2O)$
(6) $RSO_3H + HSO_3^- \rightarrow RSO_3^- + H_2SO_3$
(7) $HSO_3^- + \text{lignin OH} \rightarrow \text{lignin SO}_3^- + H_2O$ lignosulphonate
(8) $HSO_3^- + RCHO \rightarrow RCH(OH)SO_3^-$ hydroxysulphonate There is virtually no acid forming during this treatment, only the formation of acid anions. The lignosulphonate is fluid and water soluble.

In order to accelerate the reactions (4) to (7), ultrasonic vibratory energy is imparted onto the gaseous molecules of the pressurized environment, furnished in the form of a strategically located ultrasonic transducer or a plurality of such transducers.

The chips or shreds, when exposed to radiation, experience a force equivalent to that energy arriving at the surfaces plus that which is reflected. But since such stray beams or reflections are met by another closely positioned chip or shred, it absorbs such stray energy, thus little loss in efficiency occurs within the closed reactor vessel.

Mathematically, the lowest efficiency of such ultrasonic acceleration of chemical reactions is 61% while an average efficiency of energy transmission from source to molecular collision and substitution of the donor molecule S onto the acceptor lignin molecule is approximately 80%.

↓

BLOW TANK (49)

P=slightly higher than atmospheric
T=230–290 deg. F.

(a) Target plate impingement of chips or pulp mass,
(b) Defibration and loosening of fibre bundles,
(c) Dis-engagement of remaining gases within the mass,
(d) Vacuum withdrawal of dis-engaged gases,
(e) Transport of pulp mass to centrifuge (52) to separate lignin constituents from the fibres.

In the operation of the process, in addition to cleaning and screening of the continuously travelling mass of raw chips, each chip receives a water bath as a result of submergence for a period of about 15 minutes, which is the time of travel from the inlet to discharge, in which period all chips receive a substantially uniform amount of moisture ranging from 50 to 100 percent based on oven dry weight of wood, such moisture being held in the capillaries of the fibres and in the natural matrix of woody substance.

In the said washer, the temperature of the water may be maintained at 60 to 120 degrees F. without discomfort to the operating personnel from the emission of sulphur dioxide from the re-run and in maintaining the said washer water at slight acidic condtion and pH value of 5 to 6, this procedure having been initiated after initial plant start-up and maintaining the said concentration of the wash water thereafter.

In FIG. 12 the strained and drained wood chips as discharged from the chip washer are transported via the bucket elevator 10 into the pressure feeder 11 whose primary function is presteaming with a small quantity of low pressure steam at a temperature of approximately 220° F. and evacuation of entrained and interchip space air, such interchip space air forming a front ahead of the invading steam and being continuously evacuated by means of vacuum blower 11A. The mass then enters the pretreater 13 which is a pressure vessel equipped with a drag type stainless steel conveyor having several inlet and outlet connections for flow of gaseous chemical reagents and withdrawal and circulation purposes as previously described. This is maintained at a temperature of about 220° F. furnished by a plain carbon steel jacket 70 suitably insulated for conservation of heat and protection of personnel. The chief reactions occurring within the pretreater 13 are absorption of the reactant, namely anhydrous ammonia, so proportioned quantitively that at any time interval, the weighted amount of the reactant is equal to the minimum required amount for the formation of ammonium hydroxide with the chips, in sufficient quantity to form ammonium bisulphite after the introduction of the chips into the reactor 23.

The keen competition for the available water between the strongly dehydrating sulphur dioxide and ammonia gases in wood, favours shifting of the available water towards the surface of the wood chips. This condition would be unfavourable to the sulphonation reaction, which is relied upon to accomplish delignification in an economically reasonable time period. The presence of water within the chips is essential to in-situ production of ammonium hydroxide and instantaneous production of bisulphite on exposure to sulphur dioxide.

This loss is made up on a continuous basis by injection, under pressure, of the water from the storage tank 21. The maintenance of the essential conditions of environment, gas strength, total moisture content, temperature and gas vapour pressure within the pretreater, ranging between 25 and 100 pound per square inch, are of paramount importance for the proper and successful penetration of the reactants into the wood.

While ideally, condensation of the alkali vapor should be minimal, the mere size of the equipment will undoubtedly condense a given amount of the water vapour which will accumulate in the lower section of the pretreater, and this liquid will be withdrawn via the automatic stainless steel steam strap 16 and diverted into knock-out drum 17 onto the travelling chip mass in reactor 23 and the gaseous component returned via conduit 18, compressor 19 and re-entry into 13.

The travelling chip mass, after passing through the pretreater 13, enters via the rotary feed valve 22 into reactor 23, which is a vertical pressure vessel having a stainless steel lining or constructed from stainless steel clad carbon steel and equipped with strategically located ultrasonic transducers of either piezoelectric, ceramic, magnetostrictive or electrostrictive construction capable of radiating ultrasonic energy and vibrations in a frequency range of 10,000 to 500,000 cycles per second.

This radiation is imparted onto the gaseous medium under pressure within the said reactor, causing acceleration of the reactive gas molecules in accordance with the Classic Theory of Gas Dynamics and chain collisions of the said gas molecules in accordance with Quantum Mechanics thus initiating, performing and completing the reaction with the free radicals of the lignin molecule, alteration of the said lignin molecule and transformation into a soluble form in a strong ultrasonic field of standing, longitudinal waves. Such waves may be continuous or pulsed, but continuous waves are preferred in this invention.

The pressure within the reactor is maintained at a higher level than within the pretreater, namely between 50 to 150 pounds per square inch and at a temperature of 240 to 300 degrees F. provided by a steam jacket around the reactor (not illustrated).

There will be no contamination of the steam generator water with that used for processing as each stream has its own circuit and is continuous and automatic in operation.

After passing through the reactor irradiation zone which is the upper portion of the vessel, and at controlled speed synchronized with that of the pretreater 13, the chip mass enters by gravity feed, the lower depolymerization zone 83A which is substantially a retention tank formed integrally with the reactor structure equipped with spray nozzles 114 pointing in the downward direction and carrying previously extracted water under pressure exceeding that in the separator zone and at about 500 pounds per square inch. This is for the purpose of washing down and separating the previously depolymerized and thermoplastic soluble lignin components of the wood, which, although made substantially soluble during the ultrasonic treatment, require a mechanical process such as spray washing in order to provide an effective method for the actual removal of the said lignin or lignosulphonic acid from the fibre matrix. Care must be excercised that the level of the separator does not reach too high, so as to completely submerge the delignified pulp mass. This may be omitted if dry separation is practiced.

On leaving the reactor separator zone, the pulp mass enters blow tank 49, pulp screens and pulp washers (not illustrated), which equipment and mode of operation is known in the prior art and is commercially available.

From the foregoing, it will be seen that this invention makes it possible to convert standard wood chips in solid form as received from the log chipper or as purchased and stored on the mill site, into commercially acceptable and merchantable pulp, rapidly and efficiently with marked reduction in auxiliary equipment, particularly that equipment associated with recovery of pulping chemicals comprising recovery boiler, causticizing machinery, evaporators of cooking liquors, lime kilns and other costly apparatus.

The fundamentals underlying this invention makes use of the naturally available moisture in any woody substance through the phenomena of absorption of atmospheric moisture and humidity, and once taken-up into the capillaries it gives-up such moisture with great reluctance. Sufficient natural water is available within the cellular matrix of individual chips to mix with the invading gaseous reactants thus forming acids and salts which in turn react with the free radical groups of the lignin holding the fibrous structure of wood together, and, through sulphonation and hydrolysis, the chemical bonds are ruptured thus freeing the fibres.

With respect to the ultrasonic treatment an integral part of this process, such ultrasonic irradiation is essential for the performance and completion of the reactions in an economical time period, which otherwise would require a much greater period. The transport mechanism furnished during the ultrasonic treatment, gives the reactants added mobility and momentum thereby eliminating any possibilities of stagnant pockets or areas within the chip mass which would otherwise pass through as partially or only fractionally pulped, thereby resulting in a loss and necessitating a re-run.

Although some delignification may well occur without the use of ultrasonics under the conditions outlined hereabove, the penetration of the reactive chemicals would be poor and a high percentage of rejects would result. Once the process is initiated, and a continuous flow of wood chips each containing a given amount of atmospheric moisture, averaging 50 percent on the North American Continent, is allowed to enter the pulping system, the subject process will generate a small surplus amount of water, which may be utilized for subsequent washing and refining of the pulp in preparation for decking or stock dilution for paper manufacture. Moreover, the total absence of conventional cooking liquors and the customary equipment, supplies and preparation facilities, further reduce the investment requirements and greatly simplify operation and control, notwithstanding the greatest advantage, which is the total elimination of air and water pollution, since there will be no toxic fumes or the necessity of a recovery furnace with its associated products of combustion, and no burning of the recovered lignin, which may be stored in waste ponds.

The magnetostrictive transducer 114 consists of a cylindrical casing 115 and is closed at the lower end by the rounded portion 116 as illustrated in FIG. 10.

Means are provided to suspend the transducer components within the vessel at the upper end 117 thereof and in this connection a flanged collar 118 engages within an aperture in the upper end 117 of the vessel and is welded thereto as indicated by reference character 119.

A flanged ring 120 registers on the flange 121 of the collar and is welded at the inner edge thereof around the upper end 122 of the cylindrical casing 115, as indicated by reference character 123. This suspends the casing within the vessel and is spaced from the cylindrical portion of the collar 118.

A cover plate 124 engages the flanged ring 120 and the plate ring and flange 121 may either be welded together or, alternatively, bolted as indicated by nut and bolt assemblies 125.

A centrally located boss 126 is formed on the plate 124 and a tube 127 screw threadably engages this boss upon the underside thereof and extends downwardly towards the lower end 116 of the cylindrical casing 115.

A further tube or conduit 128 screw threadably engages the upper side of the boss and is connected via conduit 129, to a source of coolant (not illustrated).

The tube 127 is a combination coolant intake and transducer element supporting member and the tube is open at the lower end thereof as indicated by reference character 130 so that the coolant may pass downwardly of the tube 127, enter the casing at the lower end 130 thereof and then pass upwardly in the casing to discharge through coolant return conduits 131 screw-threadably engaging within the cap or cover plate 124 and connected to a coolant return line or conduit 132.

A plurality of sets of transducer elements are supported between the tube 127 and the inner surface of the wall of the casing 115 and FIG. 10A shows an arrangement of these elements. FIG. 10A shows four such elements 133 surrounding the supporting cores. Care should be exercised in the design of the assembly and casing 115 so that the assembly is at resonance with the applied frequency.

Various modifications can be made within the scope of the inventive concept which is herein disclosed and/or claimed.

What I claim as my invention is:

1. A pollution-free process for delignification of woody substances in a closed, gaseous environment in the absence of cooking liquids and aqueous solutions of reactive chemicals, said gases forming in situ the required acids and alkalis in minute quantities to effect penetration, impregnation and depolymerization of the lignin molecules in said chip mass comprising the steps of:

chipping or shreading said woody substances to produce a chipped mass; passing said chipped mass through a water bath until said chips retain a substantially uniform, predetermined quantity of water therein; conveying said chipped mass to a pressure feeder; removing the entrained inter-chip space air therefrom; feeding said chipped mass into a pretreater; heating said mass and subjecting said mass, in said pretreater, to water vapor and ammonia to form a weak electrolyte therein; conveying said pretreated chipped mass to a pressurized reactor; heating said mass and circulating a lignin depolymerizing gas selected from the group consisting of acidic, alkali, hydrocarbon, halogen and oxidant gases through said chipped mass; separating the depolymerized and thermoplastic, soluble lignin from said mass by washing the resultant soluble lignin from said mass; transferring said mass to a blow tank; extracting, on a continuous basis, said depolymerizing gas and water removed from said mass; separating the water from the gas, drying the gas, returning a portion of the water to the reactor and recirculating the dried gas through the reactor.

2. The process according to claim 1 in which the pretreatment of said chip mass occurs at a temperature between 220° F. and 250° F. and at pressure of between 25 and 100 pounds per square inch.

3. The process according to claim 2 which includes the additional step of irradiating said chip mass in the reactor with ultrasonic radiations of a frequency range of between 10 kHz. and 500 kHz.

4. The process according to claim 1 which includes the additional step of irradiating said chip mass in the reactor with ultrasonic radiations of a frequency range of between 10 kHz. and 500 kHz.

5. The process according to claim 1 which includes the additional step of washing the chip mass to remove the thermoplastic soluble lignonsulphonate from said chip mass.

6. The process according to claim 5 which includes the additional step of irradiating said chip mass in the reactor with ultrasonic radiations of a frequency range of between 10 kHz. and 500 kHz.

7. The process according to claim 1 which includes the additional step of irradiating said chip mass in the reactor with ultrasonic radiation having a freqeuncy between 10 kHz. and 500 kHz.

8. The process of claim 1 wherein said mass is subjected to steam and anhydrous ammonia gas at a temperature of at least 220° F. in said pretreater and wherein the lignin depolymerizing gas is sulphur dioxide.

9. The process according to claim 8 which includes the additional step of irradiating said chip mass in the reactor with ultrasonic radiations of a frequency range of between 10 kHz. and 500 kHz.

10. The process according to claim 8 wherein the pretreating phase forms ammonium hydroxide in said chips, so that when sulphur dioxide gas is circulated through said mass, said gas forms bisulphite within each wood chip containing moisture to sulphonate the lignin molecules therein.

11. The process of claim 1 wherein said mass is subjected, in said pressure feeder, to pressure of approximately 15 p.s.i.g. and temperature of from 220°–250° F.

12. The process of claim 1 wherein said pretreated chipped mass is subjected, in said reactor, to pressure of from 50–150 p.s.i.g. and temperature of from 240°–300° F.

13. The process of claim 1 wherein the predetermined quantity of water retained in said chips is from 50–100% water based on the oven-dry weight thereof when said chips are introduced into said pressure feeder.

14. A pollution-free process for delignification of woody substances in a closed, gaseous environment in the absence of cooking liquids and aqueous solutions of reactive chemicals, said gases forming in situ the required acids and alkalis in minute quantities to effect penetration, impregnation and depolymerization of the lignin molecules in said chip mass comprising the steps of:

chipping or shreading said woody substances to produce a chipped mass; passing said chipped mass through a water bath until said chips retain a substantially uniform, predetermined quantity of water therein; conveying said chipped mass to a pressure feeder; removing the entrained inter-chip space air therefrom; feeding said chipped mass into a pretreater; heating said mass and subjecting said mass; in said pretreater, to water vapor and ammonia to form a weak electrolyte therein; conveying said pretreated chipped mass to a pressurized reactor; heating said mass and circulating a lignin depolymerizing gas selected from the group consisting of acidic, alkali, hydrocarbon, halogen, and oxidant gases through said chipped mass; separating the depolymerized and thermoplastic, soluble lignin from said mass by transferring said mass to a blow tank; extracting, on a continuous basis, said depolymerizing gas and water removed from said mass; separating the water from the gas, drying the gas, returning a portion of the water to the reactor and recirculating the dried gas through the reactor; and subsequently separating the lignin from the fibres in a centrifuge.

15. A pollution-free process for preparing wood pulp from a chipped mass of woody substances in a closed, gaseous environment in the absence of cooking liquors and aqueous solutions of reactive chemicals, said gases forming in situ the required acids and alkalis in minute quantities to effect penetration, impregnation, and depolymerization of the lignin molecules in said chipped mass comprising the steps of:

conveying said chipped mass through a water bath until said chips retain a substantially uniform quantity of water of from 50–100% therein; evacuating the inter-chip space air from said mass; feeding said chipped mass into a pressurized closed vessel; treating said mass with anhydrous ammonia gas and steam at a temperature of from about 220°–250° F. and at a pressure within said vessel of from 25–100 p.s.i.g.; subsequently feeding said mass into a pressurized reactor having an internal pressure of from 50–150 p.s.i.g. and a temperature of 240°–300° F.; introducing gaseous sulphur dioxide into said mass and subjecting said mass to ultrasonic radiation having a frequency of 10 kHz.–500 kHz.; washing the resultant soluble lignin from said mass and transferring said mass to a blow tank, extracting on a continuous basis said sulphur dioxide gas and water removed from said mass; separating the water from the gas; drying the gas; returning part of the water to the reactor and recirculating the dried gas back to the reactor.

References Cited

UNITED STATES PATENTS

| | | | |
|---|---|---|---|
| 803,391 | 10/1905 | Blackmore | 162—63 |
| 2,032,437 | 3/1936 | Richter | 162—63 X |
| 1,119,977 | 12/1914 | Moore | 162—64 X |
| 1,472,318 | 10/1923 | Atkinson | 162—63 X |
| 1,016,178 | 1/1912 | Sammet | 162—64 X |

FOREIGN PATENTS

| | | | |
|---|---|---|---|
| 85,417 | 9/1953 | Czechoslovakia | 162—64 |
| 554,839 | 3/1958 | Canada | 162—50 |
| 613,795 | 1/1961 | Canada | 162—50 |

S. LEON BASHORE, Primary Examiner

A. L. CORBIN, Assistant Examiner

U.S. Cl. X.R.

162—63, 64

UNITED STATES PATENT OFFICE
CERTIFICATE OF CORRECTION

Patent No. 3,726,756           Dated April 10, 1973

Inventor(s)   Mario Witold Polak

It is certified that error appears in the above-identified patent and that said Letters Patent are hereby corrected as shown below:

Column 3,
line 64, "quipment" should read --equipment--.
  Column 4, line 20, "region" should read --a region--.
  Column 5, line 3, "schemtaic" should read --schematic--;

Column 6, line 28, "to back to" should read --back to--; line 31, "hence to he" should read --thence to the--; line 40, "his" should be --this--; line 60, "Futher" should read --Further--; line 73, "start" should read --star--.
  Column 7, "the fans" should read --fans--; line 12, "chip" should read --chips--; line 13, "throught" should read --through--; line 20, "diaphram" should read --diaphragm--; line 37, "and at" should read --at--.
  Column 8, line 1, "mold" should read --mild--.
  Column 9, line 60, "$RSO_3H \rightarrow RSO_3\text{-}H+$" should read - $RSO_3H \rightarrow RSO_3\text{-}+H+$ --.

Column 10, line 40, "condtion" should read --condition--; line 64, "with" should read --within--.
  Column 11, line 8, "pound" should read --pounds--; line 16, "strap" should read --trap--.
  Column 12, line 21, "treatment an" should read --treatment forming an--; line 46, "requirments" should read --requirements--.
  Column 14, line 42, Claim 14, "mass;" should read --mass--.

Signed and sealed this 27th day of November 1973.

(SEAL)
Attest:

EDWARD M. FLETCHER, JR.          RENE D. TEGTMEYER
Attesting Officer                 Acting Commissioner of Patents